(12) United States Patent
Burchell et al.

(10) Patent No.: US 9,415,948 B1
(45) Date of Patent: Aug. 16, 2016

(54) METHOD FOR STABILIZING BOTTLES FOR PATTERN FORMING AND RELATED DEVICE

(71) Applicant: SEETECH SYSTEMS, INC., York, PA (US)

(72) Inventors: Victor Howard Burchell, York, PA (US); James Harper Moffitt, York, PA (US)

(73) Assignee: SEETECH Systems, Inc., York, PA (US)

( * ) Notice: Subject to any disclaimer, the term of this patent is extended or adjusted under 35 U.S.C. 154(b) by 0 days.

(21) Appl. No.: 14/964,837

(22) Filed: Dec. 10, 2015

(51) Int. Cl.
*B65G 47/29* (2006.01)
*B65G 47/26* (2006.01)
*B65G 47/08* (2006.01)
*B65G 47/88* (2006.01)

(52) U.S. Cl.
CPC ............ *B65G 47/266* (2013.01); *B65G 47/088* (2013.01); *B65G 47/261* (2013.01); *B65G 47/8892* (2013.01); *B65G 2201/0244* (2013.01); *B65G 2205/04* (2013.01)

(58) Field of Classification Search
CPC .. B65G 47/088; B65G 47/261; B65G 47/266; B65G 47/8884; B65G 47/8892; B65G 2201/0244; B65G 2205/04
USPC ........... 198/418.5, 418.7, 419.1, 419.3, 459.7
See application file for complete search history.

(56) References Cited

U.S. PATENT DOCUMENTS

| | | | | |
|---|---|---|---|---|
| 6,206,173 B1 * | 3/2001 | Gallet | ................. | B65G 47/088 198/434 |
| 7,815,034 B2 * | 10/2010 | Fleck | ................... | B65B 35/405 198/418.7 |
| 8,448,777 B2 * | 5/2013 | Pazdernik | ............ | B65G 47/088 198/418.6 |
| 8,875,869 B1 | 11/2014 | Burchell et al. | | |
| 9,315,338 B2 * | 4/2016 | Peterman | ............... | B65G 47/29 |
| 2014/0262685 A1 * | 9/2014 | Job | ........................ | B65G 47/29 198/419.1 |

\* cited by examiner

*Primary Examiner* — Leslie A Nicholson, III
*Assistant Examiner* — Keith R Campbell
(74) *Attorney, Agent, or Firm* — Hooker & Habib, P.C.

(57) ABSTRACT

A method of forming on a moving conveyor belt an article layer formed from multiple article row sets includes capturing the article row sets between adjacent pairs of fences to stabilize the articles while forming the article layer. An article stabilizing device for carrying out the method includes a number of individually movable fences that move between standby and operating positions to capture the article rows sets.

26 Claims, 11 Drawing Sheets

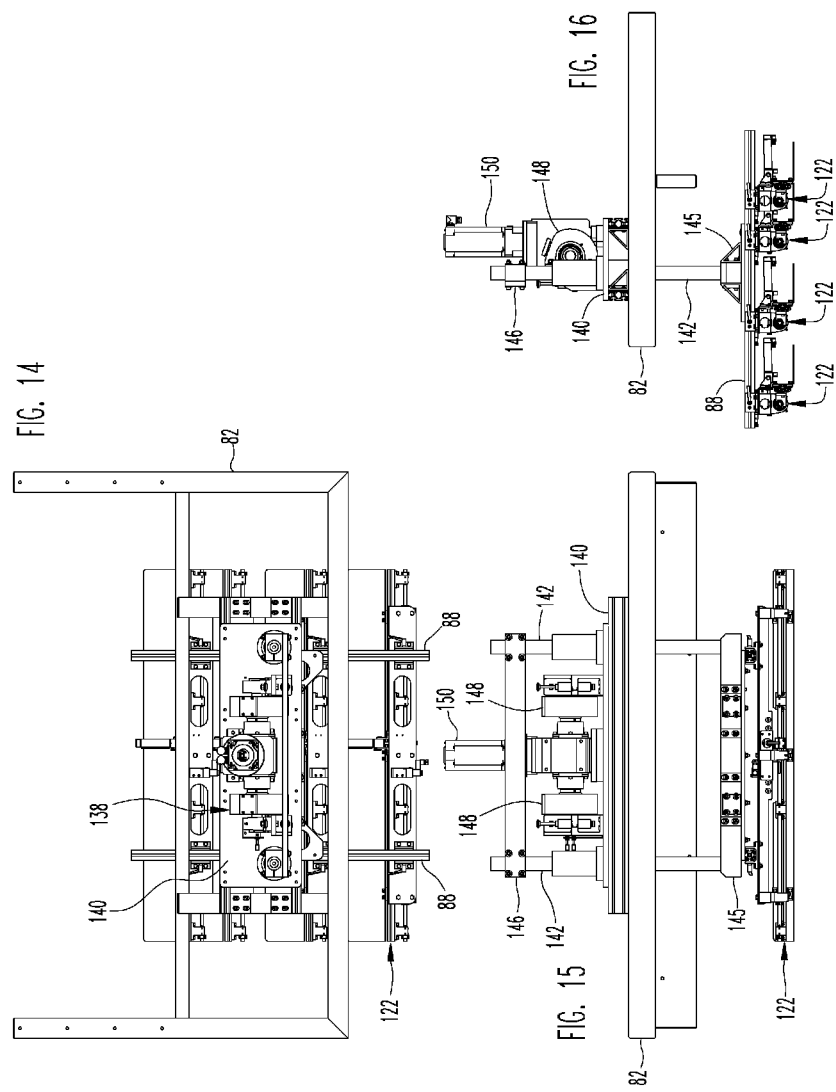

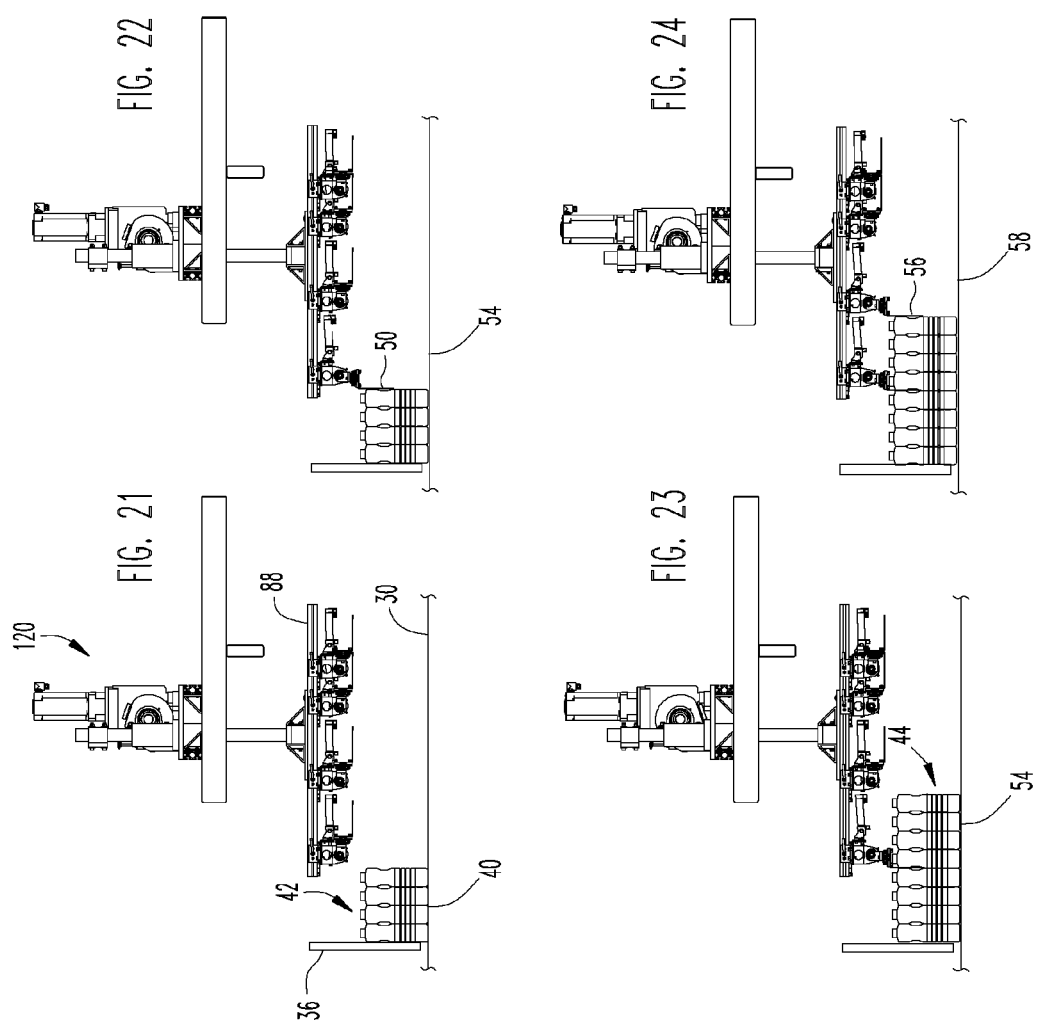

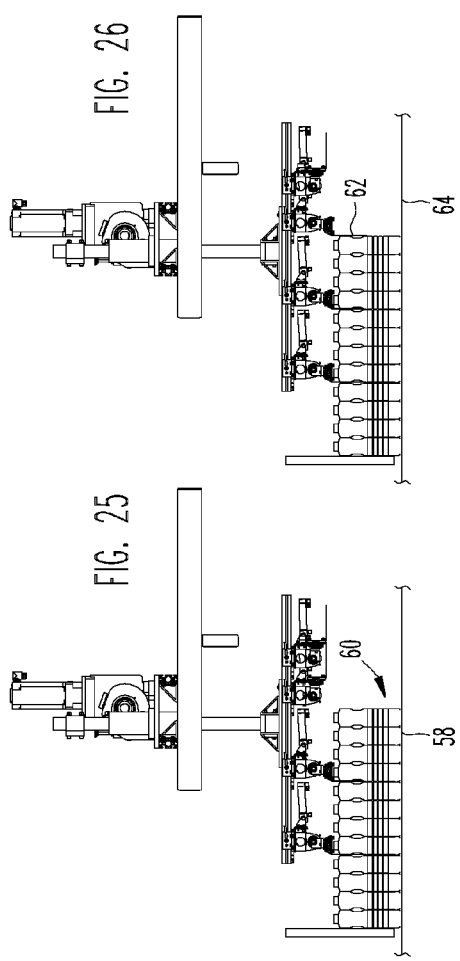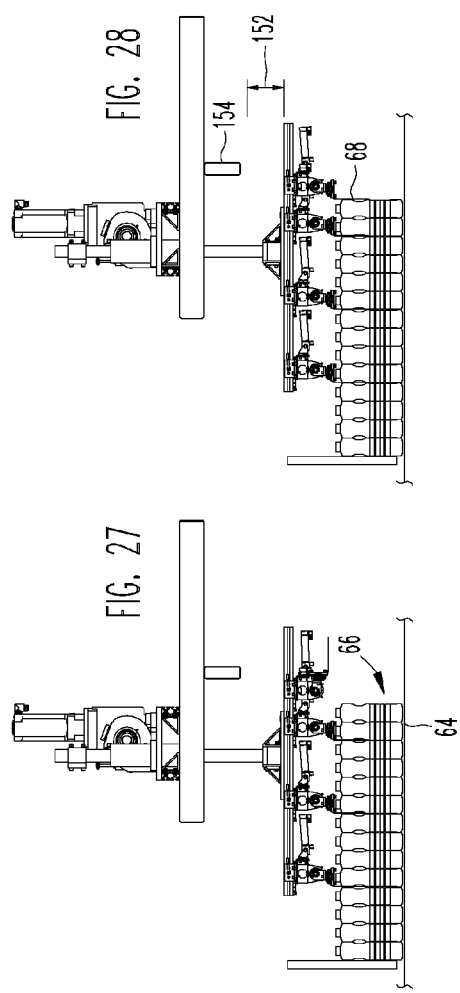

METHOD FOR STABILIZING BOTTLES FOR PATTERN FORMING AND RELATED DEVICE

FIELD OF THE DISCLOSURE

The disclosure relates generally to organizing articles (containers, bottles, or like objects) into a pattern for transport, and more specifically, stabilizing the articles while forming the pattern.

BACKGROUND OF THE DISCLOSURE

Empty articles, such as bottles or other types of containers, are arranged into a pattern of rows and columns on a conveyor belt to form an article layer on the belt that will be moved onto a pallet or is otherwise processed. The article layer consists of the desired number of rows and columns of containers arranged in the desired pattern.

The article layer is formed by moving one or more rows of articles downstream on the conveyor belt from a feeder towards a stationary fence or stop placed in an operating position over the conveyor belt. When in the operating position the fence obstructs and prevents downstream movement of articles past the fence, thereby defining an accumulation area on the conveyor belt extending upstream from the fence where the accumulation layer is formed.

The one or more rows of articles supplied by the feeder are usually provided in sets of rows that spaced apart from one another. A leading row of articles coming into the accumulation area impacts against the fence or against the most upstream stationary row of articles already in the accumulation area. The impacts cause the leading row to come to a stop while the article layer is being formed.

The impact forces applied to the surfaces of the impacting articles may cause an article to fall or displace, destroying the desired pattern. The inventors' U.S. Pat. No. 8,875,869 (owned by the applicant of this application and incorporated by reference herein) discloses a method and device for forming an article layer from articles in which impact forces cause unwanted article rotation.

SUMMARY OF THE DISCLOSURE

Disclosed is a method for stabilizing articles while forming on a moving conveyor belt an article layer formed of a plurality of article row sets. Each article row set is formed from one or more rows of articles.

The method includes the step of conveying on the conveyor belt an article row set in a downstream direction to a fence extending across the conveyor belt and being disposed to obstruct further downstream movement of articles on the convey belt.

When the article row set reaches the fence obstructing further downstream movement of the article row set, an additional fence is placed across the conveyor belt adjacent to a last upstream row of the article row set. This captures the article row set is captured between the fence and the additional fence to stabilize the articles of the captured article row set. The additional fence obstructs further downstream movement of articles on the conveyor belt.

In a possible embodiment of the method, adjacent pairs of fences may "clamp" or compress the captured article row set between them to press the articles together and further stabilize the articles.

If the article layer is not complete, one more additional article row sets are conveyed on the conveyor belt in the downstream direction and captured between adjacent pairs of fences.

After the article layer is complete, all but the most downstream fence is moved away from the conveyor belt to a standby position wherein the fences do not obstruct further downstream movement of the article layer on the conveyor belt. After these fences are moved to standby positions, the most downstream fence is moved to a standby position to allow the conveyor belt to move the accumulated article layer past all the fences.

An article stabilizer device that assists in carrying out the method includes a frame, and a number of fences movably attached to the frame. Each fence is independently and selectively movable with respect to the frame from a first standby position to an operating position, from the operating position to a second standby position, and from the second standby position to the first standby position.

The article stabilizer device is in a first operating state when the fences are each in the first standby position and is in a second operating state when the fences are each in the operating position and is in a third operating state when the fences are each in the second standby position.

When the article stabilizer device is in the second operating state, the fences are spaced apart from each other and define a conveyor path with respect to the frame extending in a downstream direction along the fences. The fences obstruct articles being conveyed by the conveyor belt along the conveyor path when the conveyor path is located adjacent the conveyor belt. The fences are spaced apart from one another wherein adjacent pairs of fences cooperatively define an accumulation area between them along the conveyor path to permit articles on the conveyor path to be captured and retained in the accumulation area between the adjacent pairs of fences.

When the article stabilizer device is in the first operating state or the third operating state, the fences are spaced away from the conveyor path so as to not obstruct articles being conveyed by the conveyor belt when the conveyor path is located adjacent the conveyor belt.

Each upstream fence of the adjacent pairs of fences is movable from the first standby position to the operating position without entering the accumulation space cooperatively defined between the upstream fence and the adjacent downstream fence of the adjacent pair of fences. In this way the article row set being captured does not obstruct movement of the upstream fence.

Each fence is also movable from the operating position of the fence to the second standby position of the fence without entering any accumulation area cooperatively defined by the fence.

In an embodiment of the article stabilizer device, the fences are mounted on an elongate fence holder extending along the conveyor path. The fence holder is movable with respect to the frame to move the fences simultaneously away from the conveyor belt after the article layer is formed.

In a further embodiment of the article stabilizer device, the fences are rotatably mounted on the fence holder for movement of the fence from the standby position to the operating position. This provides for a particularly compact assembly.

In other possible embodiments of the article stabilizer device, the fences translate between standby and operating positions.

In yet other possible embodiments of the article stabilizer device, each fence is formed as two separate members that are placed side-by-side with one another to define the operating position of the fence.

The disclosed method and device stabilize efficiently stabilize articles on a moving conveyor belt while an article layer is being accumulated and formed on the conveyor belt and is particularly useful when forming article layers of empty, plastic blow molded articles that would tip or move out of row alignment when bottles of an incoming row set impact the accumulated bottles stationary on the conveyor belt.

Other objects and features of the disclosure will become apparent as the description proceeds, especially when taken in conjunction with the accompanying drawing sheets illustrating one or more illustrative embodiments.

BRIEF SUMMARY OF THE DRAWINGS

FIGS. 14-16 are top, front, and side views respectively of the article stabilizer device shown in FIG. 13;

FIGS. 21-28 illustrate forming a multi-row pattern of containers using the article stabilizer device shown in FIG. 13.

DETAILED DESCRIPTION

Figure 1:
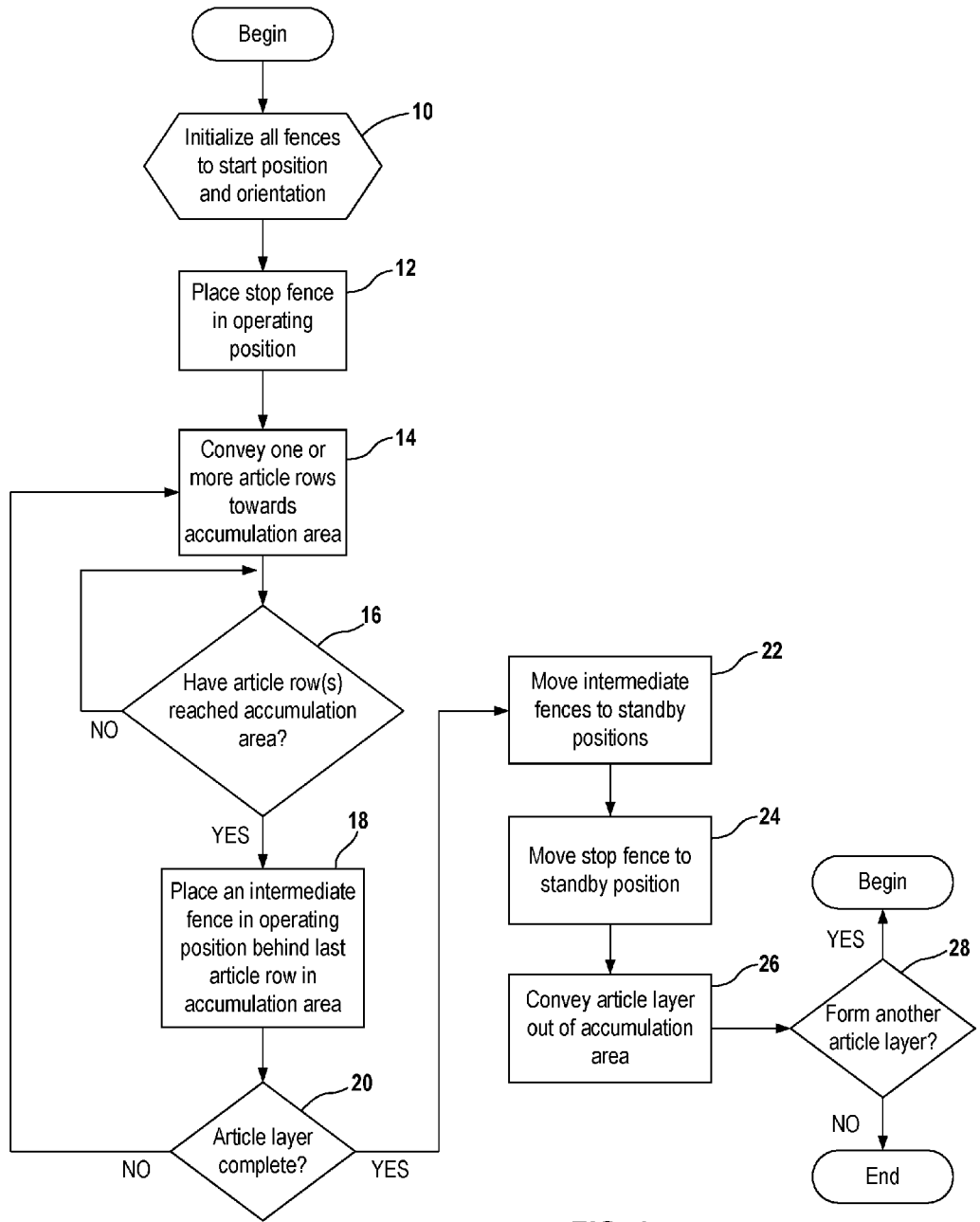
FIG. 1 is a flow chart of an embodiment of the disclosed method.

FIG. 1 is a flow chart illustrating an embodiment of a method for forming an article layer consisting of a number of rows of articles that are not self-patterning.

The method utilizes a downstream stop fence (or stop fence herein) that is the most downstream fence and one or more additional, intermediate stop fences (intermediate fences herein), the intermediate fences having operating positions upstream from the stop fence to form the article layer. Before forming the article layer, the method includes the step 10 of placing each fence in an initial starting position away from the conveyor belt and, as will be explained in more detail below, in an initial starting orientation as required to not obstruct the conveyor belt.

The method includes the step 12 of moving the downstream fence to an operating position with respect to the conveyor belt in preparation for forming an article layer.

The method includes the step 14 of conveying one or more rows of articles towards the accumulation area.

The method includes the step 16 of determining whether the one or more articles moving towards the accumulation area have reached the accumulation area. An article row in possible embodiments reaches the accumulation area extending upstream from the fence when it impacts the fence.

If the article row(s) have reached the accumulation area, the method includes the step 18 of placing an intermediate fence in an operating position upstream from or behind the last of the one or more articles that have reached the accumulation area. In possible embodiments, sensors connected to an automatic control system detect that the article row(s) have reached the accumulation area and the control system responds to the system state to place the intermediate screens in their operating positions.

The intermediate fence obstructs movement of article rows past the intermediate fence. Preferably when the intermediate fence is placed in its operating position, the intermediate fence engages the last article row in the accumulation area and urges the last article row downstream towards the next adjacent downstream fence. This slightly compresses the article rows between the two fences and aids in stabilizing the bottles in the article rows.

The method includes the step 20 of determining whether or not the article layer is complete. If the article layer is not complete, the method includes repeating steps 14-18 to receive another set of article rows into the accumulation area and placing an intermediate fence behind the last row of articles received into the accumulation area.

If the article layer is complete, the method includes the step 22 of moving the intermediate fences to a standby position in which the intermediate fences no longer obstruct article rows on the conveyor belt. The downstream fence remains in its operating position and so the article layer remains against the stop fence in the accumulation area while the intermediate fences move to their standby positions.

The method includes the step 24 of moving the stop fence to its standby position in which the stop fence no longer obstructs the article layer. The method includes the step 26 of the conveyor belt conveying the article layer out of the accumulation area for further processing.

If it is desired to form another article layer at method step 28, the method begins again.

FIGS. 2-9 illustrate carrying out the method shown in FIG. 1 utilizing a pattern-forming device that forms an article layer of articles 32 on a conveyor belt 30. The pattern-forming device includes a stop fence and a number of additional, intermediate fences that cooperate with one another and the conveyor belt in forming the article layer. The fences are operatively connected to a control system that controls initial configuration of the fences and movement of the fences between operating and standby positions for carrying out the method.

The illustrated article layer has fourteen article rows. The article rows are provided from a feeder (not shown) in sets of four rows, four rows, four rows, and two rows.

Figure 2:
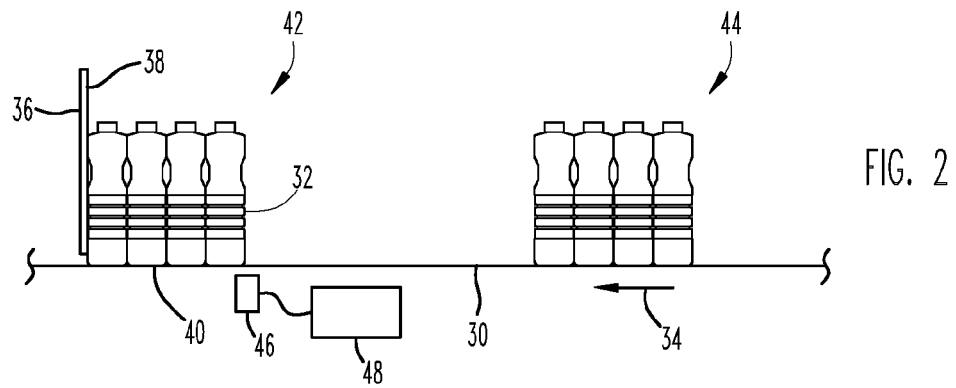
FIGS. 2-8 are side views of a conveyor on which a multi-row pattern of containers is being formed utilizing a conventional front stop and a number of intermediate stops in accordance with an embodiment the disclosed method.

FIG. 2 illustrates the top belt run of the conveyor belt that supports and conveys the rows of articles 32. The illustrated articles 32 are empty bottles having curved fronts and backs. The bottles are not self-patterning bottles.

The conveyor belt 30 conveys the bottles 32 in a downstream direction indicated by the arrow 34 towards a stop fence 36. The fence 36 is conventional and is shown in FIG. 2 in an operating position for obstructing the bottles on the conveyor belt. The fence 36 includes a flat upstream face 38 that obstructs and prevents downstream movement of bottles 12 past the fence 36. When in the operating position the fence 36 defines an accumulation area 40 on the conveyor belt 30 extending upstream from the upstream face 38 for receiving a first set of article rows.

FIG. 2 illustrates a first set 42 of four article rows and a second set 44 of four article rows spaced upstream from the first set 42 for forming the first eight rows of the article layer. The first row set 42 has just reached the accumulation area 40 and has just impacted the fence front face 38. The first row set 42 is now held stationary on the conveyor belt 30 against the stop fence 36. The second row set 44 continues to move downstream on the conveyor belt 30 and has not yet reached the accumulation area.

A sensor 46 located along the path of the conveyor belt and near the end of the accumulator area 40 is connected to a control system 48. Like sensors (not shown) are also connected to the control system 48 and placed near the end of the accumulator areas described below to notify the control system that sets of rows have reached the accumulator area associated with each sensor.

The sensor 46 transmits a control signal to the control system 48 indicating that the first row set 42 has reached the accumulation area. In response to the control signal, the control system 48 places an intermediate fence 50 in an operating position closely spaced behind the last row of articles of the row set 42. See FIG. 3.

The intermediate fence 50 has flat upstream and downstream faces 52u and 52d. When the intermediate fence 50 reaches its operating position with respect to the conveyor belt 30, the upstream face 52u obstructs and prevents downstream movement of the second row set 44 past the fence 50, and the downstream face 52d urges the most upstream article row of the first row set 42 downstream so as to slightly compress or "clamp" the article rows of the first row set 42 between the two fences 50, 36 to stabilize the bottles as previously described.

The intermediate fence 50 when placed in its operating position defines a second accumulation area 54 on the conveyor belt 30 extending upstream from the upstream face 52 for receiving a second set of article rows.

The intermediate fence 50 does not necessarily have to be identical to the stop fence 36 in height/width dimensions, nor does the spacing of the intermediate fence 50 above the conveyor belt 30 when in its operating position have to be the same as that of the stop fence 36.

Figure 4:
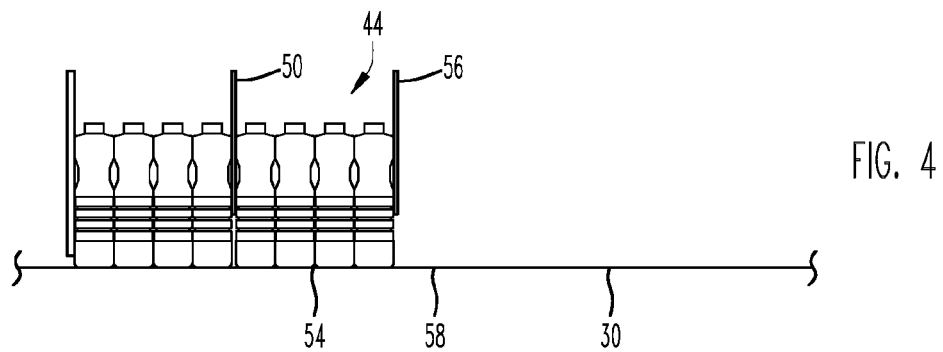

FIG. 4 illustrates the partial formation of the article layer after the second row set 44 has reached the accumulation area 54 and impacted against the intermediate fence 50. The intermediate fence 50 prevents the leading row of articles of the second row set 44 from impacting against the last upstream row of articles of the row set 42 and thus prevents the impact forces between bottles that could destroy the bottle pattern.

The control system 48 places a second intermediate fence 56 (like the intermediate fence 50) in an operating position closely spaced behind the last row of articles of the row set 44 when the row set 44 entered the accumulation area 54. The intermediate fence 56 cooperates with the fence 50 in stabilizing the bottles 32 of the second row set 44 that are between the two fences 50, 56. The intermediate fence 56 when placed in its operating position defines a third accumulation area 58 on the conveyor belt 30 extending upstream from the fence 56 for receiving a third set of article rows.

Figure 5:
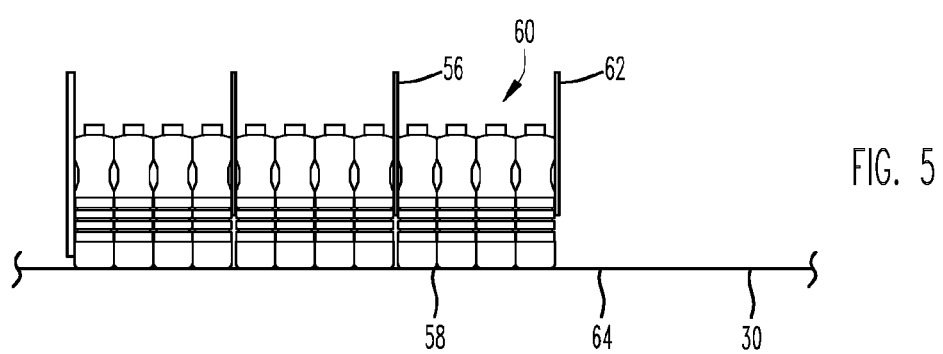

FIG. 5 illustrates the partial formation of the article layer after a third article row set 60 has reached the accumulation area 58 and impacted against the intermediate fence 56. The control system 48 places a third intermediate fence 62 (like the intermediate fence 50) in an operating position closely spaced behind the last row of articles of the row set 60 when the row set 60 entered the accumulation area 58. The fence 62 defines an accumulation area 64. The intermediate fence 56 prevents the impact from destroying the bottle pattern and cooperates with the fence 62 in stabilizing the bottles of the third row set 60 as previously described.

Figure 6:
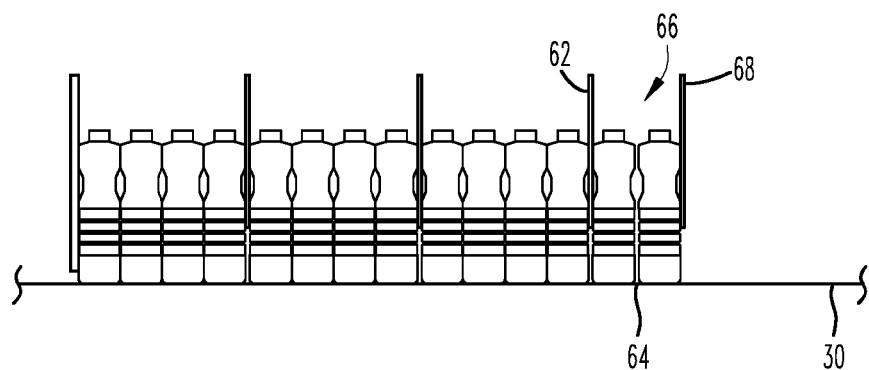
Figure 7:
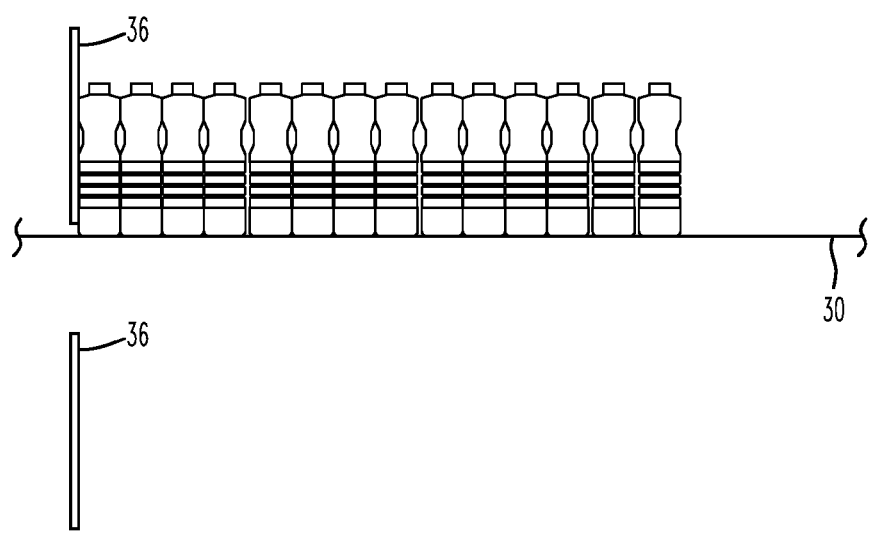

FIG. 6 illustrates formation of the complete article layer after a fourth, last article row set 66 has reached the accumulation area 64 and impacted against the intermediate fence 62.

The control system 48 places a fourth intermediate fence 68 (like the intermediate fence 50) in an operating position closely spaced behind the last row of articles of the row set 66 when the row set 66 entered the accumulation area 64. Unlike the row sets 42, 44, 60, the last row set 66 consists of only two article rows. The fence spacing between the fence 62 and the fence 68 is correspondingly less than the spacing between the other adjacent pairs of fences to compensate for there being only two article rows.

Because the row set 66 is the last row set forming the article layer, the intermediate fence 68 is used solely to cooperate with the fence 62 for stabilizing the bottles of the last row set 66. The intermediate fence 62 prevents the impact from destroying the bottle pattern and cooperates with the fence in stabilizing the bottles of the last row set 66 as previously described.

After the article layer is formed, the control system 48 moves the intermediate fences to a standby position (not shown) in which the intermediate fences do not obstruct article conveyance by the conveyor belt 30. See FIG. 7. The article layer is maintained stationary on the conveyor belt by the stop fence 36.

Figure 8:
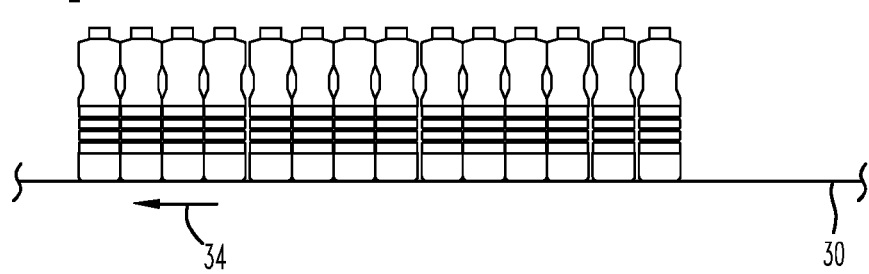

The stop fence 36 is now moved to its standby position as shown in FIG. 8. The conveyor belt 30 moves the article layer in the downstream direction 34 out of the accumulation area for further processing.

Figure 9:
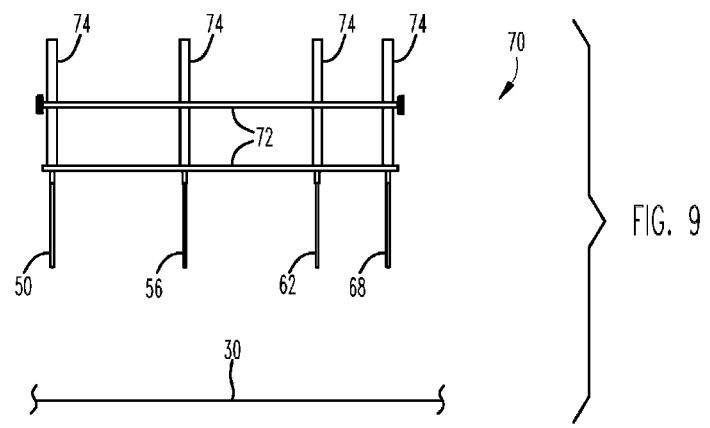
FIG. 9 is a side view illustrating in simplified form a first embodiment article stabilizer device for use in practicing the disclosed method.

FIG. 9 schematically illustrates a first embodiment bottle stabilizer assembly 70 used with the stop fence 36 for carrying out the disclosed method. The bottle stabilizer assembly 70 includes an elongate frame 72 that in use extends along the conveyor path and carries the intermediate fences 50, 56, 60, 68. Each intermediate fence is attached to a respective actuator 74 mounted to the frame 72. Each actuator 74 moves the intermediate fence vertically with respect to the frame 72 between a retracted position shown in FIG. 9 and an extended position away from the frame 72. The retracted position of the fence corresponds to the standby position of the fence and the extended position of the fence corresponds to the operating position of the fence.

As shown in FIG. 9, in use the frame 72 is placed over the conveyor belt 30 so that the intermediate fences are properly located along the conveyor belt 30 upstream from the stop fence 36 for forming the article layer. Preferably the actuators 74 are each attached to the frame 72 so as to permit selective position and spacing of the intermediate fences along the conveyor path for forming article layers made of different sets of article rows. The vertical stroke of the actuators 74 and/or the height of the frame 72 above the conveyor belt 30 is also preferably selectively adjustable for use with sets of intermediate fences having different vertical lengths for stabilizing bottles of different heights or shapes.

The intermediate fences 50, 56, 62, 64 remain in the same vertical orientation as shown in FIG. 9 throughout their stroke. In this embodiment assembly, the initial orientation, the standby orientation, and the operating orientation of the intermediate fences 50, 56, 62, 64 remain the same when carrying out the method 10. Only the relative vertical position of the intermediate fence with respect to the conveyor belt 30 changes when the fence moves between standby and operating positions. The initial position of an intermediate fence with respect to the conveyor belt 30 is the same as its standby position.

Figure 10:
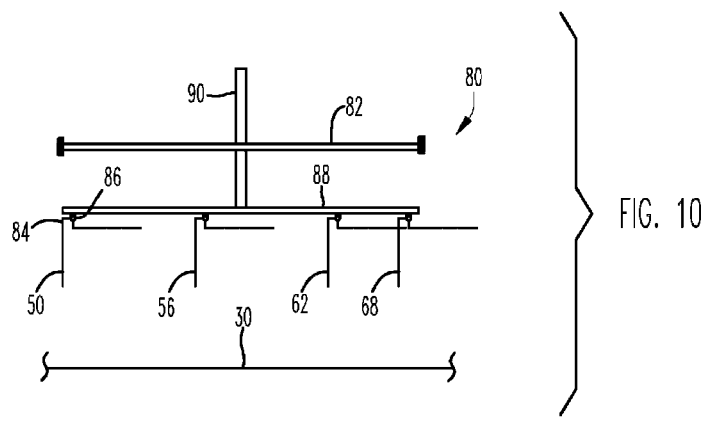
FIG. 10 is a side view illustrating in simplified form a second embodiment article stabilizer device for use in practicing the disclosed method.

FIG. 10 schematically illustrates a second embodiment bottle stabilizer assembly 80 used with the stop fence 36 for carrying out the disclosed method. The bottle stabilizer assembly 80 includes a frame 82 that carries the intermediate fences 50, 56, 60, 68. Each intermediate fence is formed as a longer leg of a respective "L" shaped fence member 84 rotatably mounted on a respective shaft 86. The shafts 86 are mounted on a pair of side-by-side, elongate arms 88 that are in turn attached to an actuator 90 carried by the frame 82.

Each "L" shaped fence member 84 is connected to a respective member actuator (not shown). Each member actuator moves its associated fence member 84 between a first, vertical orientation shown in solid lines in FIG. 10 in which the intermediate fence extends vertically and a second, horizontal orientation shown in phantom lines in FIG. 10 in which the intermediate fence extends horizontally.

A vertically aligned actuator 90 moves the arms 88 vertically with respect to the frame 82 between a retracted position shown in FIG. 10 and an extended position away from the frame 82. The retracted position of the arms 88 corresponds to the standby position of the intermediate fences and the extended position of the arms 88 corresponds to the operating position of the intermediate fences.

As shown in FIG. 10, in use the frame 82 is placed over the conveyor belt 30 so that the intermediate fences are properly located along the conveyor belt 30 upstream from the stop fence 36 for forming the article layer. Preferably the shafts 86 and the actuators are each attached to the arms 88 so as to permit selective position and spacing of the intermediate fences along the conveyor path for forming article layers made of different sets of article rows. The vertical stroke of the actuator 90 and/or the height of the frame 82 above the conveyor belt 30 is also preferably selectively adjustable for use with sets of intermediate fences having different vertical lengths for stabilizing bottles of different heights or shapes.

Initially the bottle stabilizer assembly 80 has the arms 88 in their extended positions with each of the fence members 84 in its horizontal orientation. The intermediate fences are generally parallel with the conveyor belt 30 and sufficiently spaced above from the conveyor belt 30 to permit unobstructed conveyance of bottles past the assembly 80.

To place an intermediate fence in its operating position, the actuator connected to the fence member 84 places the fence member in its vertical orientation. The intermediate fence rotates clockwise about the shaft 86 as viewed in FIG. 10 to enable the intermediate fence to move without interference caused by striking upstream article rows.

To move the intermediate fences to their standby positions after the article layer is formed, the actuator 90 moves the arms 88 vertically to the retracted position while the fence members 84 are each maintained in the vertical orientation. The vertical stroke of the actuator 90 is sufficient for the intermediate fences to remain in their vertical orientation while moving clear of the article layer to allow downstream movement of the article layer on the conveyor belt 30.

To place the assembly 80 back to its initial starting position, the fence members 84 are each placed back to the horizontal orientation and the arms 88 are moved back to the extended position.

Figure 11:
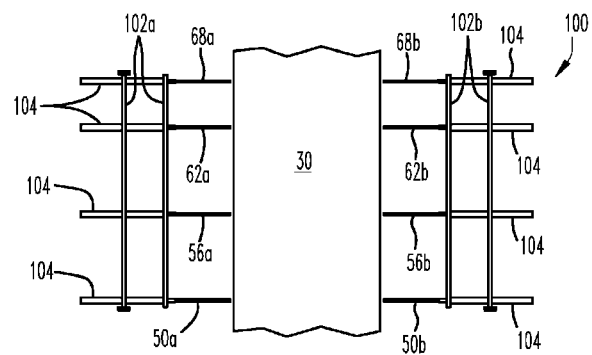
FIG. 11 is a top view illustrating in simplified form a third embodiment article stabilizer device for use in practicing the disclosed method.

FIG. 11 schematically illustrates a third embodiment bottle stabilizer assembly 100 used with the stop fence 36 for carrying out the disclosed method. The bottle stabilizer assembly 100 operation is similar in principle to the bottle stabilizer assembly 70 but is designed for horizontal displacement of the intermediate fences instead of vertical displacement as in the assembly 70. In the illustrated embodiment each intermediate fence 50, 56, 62, 68 is formed as two halves labeled "a" and "b" in FIG. 11. The frame of the bottle stabilizer assembly 100 is also formed as two members 102*a*, 102*b* that in use are disposed on opposite sides of the conveyor belt 30. By forming each intermediate fence as two halves, the stroke of the actuator 164 attached to each intermediate fence can essentially be reduced in half. When the halves of an intermediate fence are in their respective operating positions, the intermediate fence obstructs the entire width of the conveyor belt.

Figure 12:
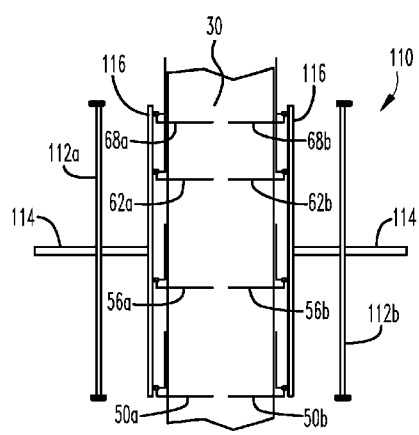
FIG. 12 is a top view illustrating in simplified form a fourth embodiment article stabilizer device for use in practicing the disclosed method.
Figure 13:
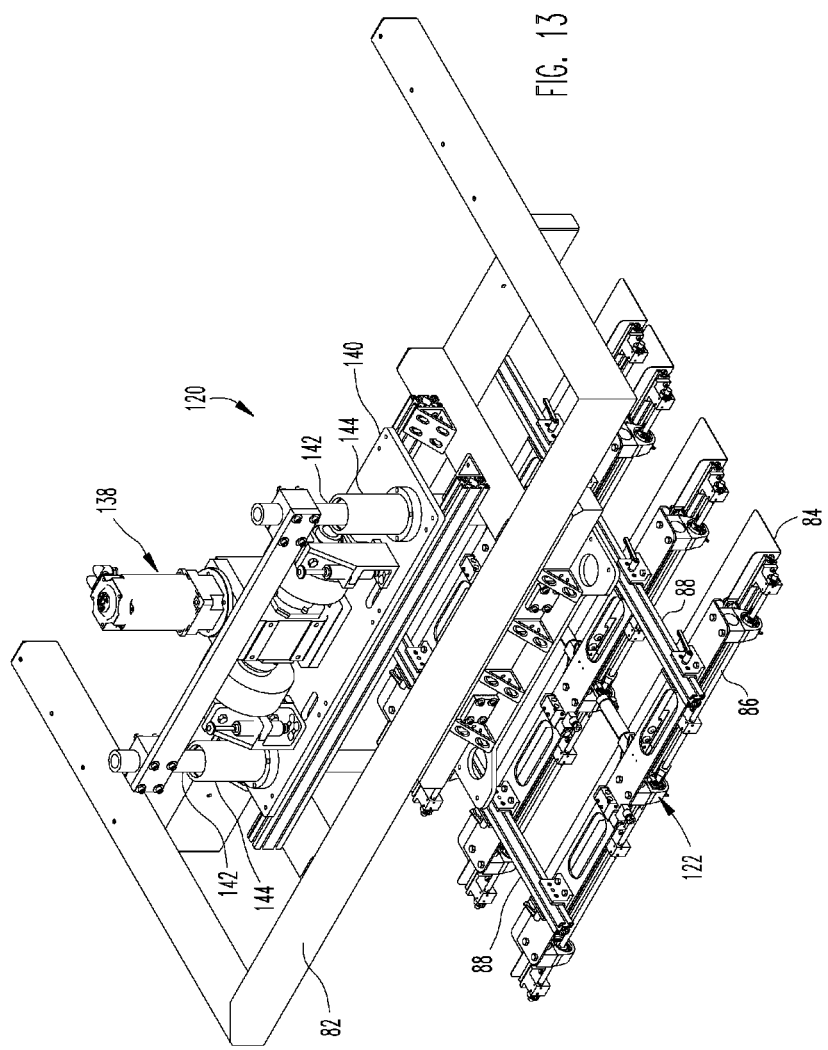
FIG. 13 is a perspective view of an article stabilizer device of the type shown in FIG. 10.
Figure 17:
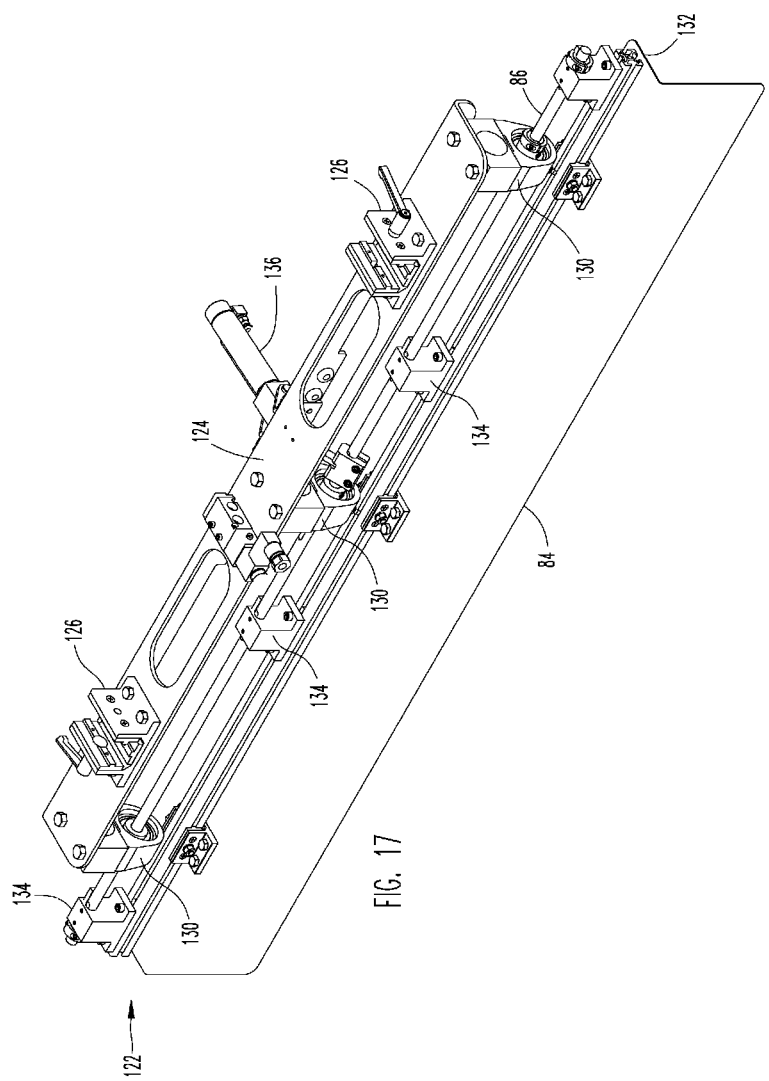
FIG. 17 is a perspective view of a stop bracket assembly of the article stabilizer device shown in FIG. 13.
Figure 18:
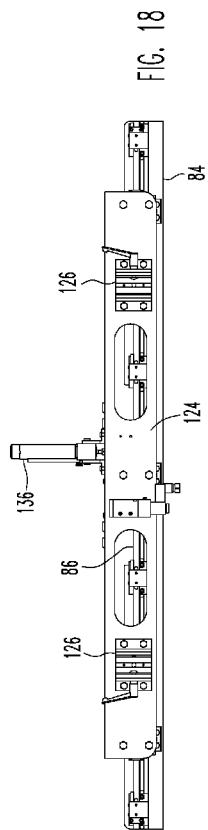
FIGS. 18-20 are top, front, and side views respectively of the stop bracket assembly shown in FIG. 17.
Figure 19:
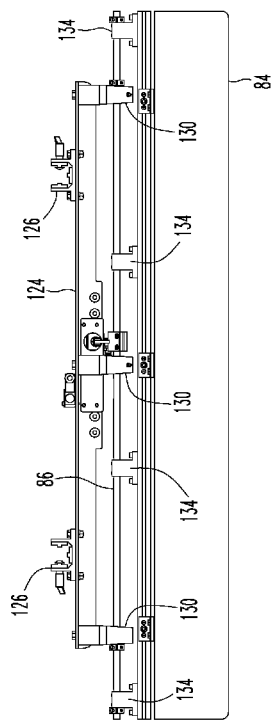
Figure 20:
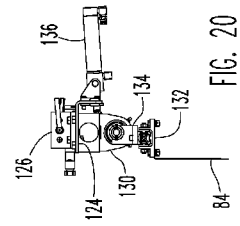

FIG. 12 schematically illustrates a fourth embodiment bottle stabilizer assembly 110 used with the stop fence 36 for carrying out the disclosed method. Operation of the bottle stabilizer assembly 110 is similar in principle to the bottle stabilizer assembly 80 but is designed for rotation of the intermediate fences about vertical axes and not horizontal axes. In the illustrated embodiment each intermediate fence 50, 56, 62, 68 is formed as two halves labeled "a" and "b" in FIG. 12. The frame of the bottle stabilizer assembly 110 is also formed as tow members 112*a*, 112*b* that in use are disposed on opposite sides of the conveyor belt 30. By forming each intermediate fence as two halves, the "sweep" of each intermediate fence half across the conveyor belt is reduced, enabling the fence half to sweep across the conveyor belt without interference from upstream article rows. When the halves of an intermediate fence are in their respective operating positions, the intermediate fence obstructs the entire width of the conveyor belt.

FIGS. 13-20 illustrate a bottle stabilizer assembly 120, which bottle stabilizer assembly 120 is a concrete implementation of the previously-described second embodiment bottle stabilizer assembly 80 shown in FIG. 10.

Each fence member 84 and shaft 86 are mounted on a fence bracket assembly 122 best seen in FIGS. 17-20. The fence bracket assembly 122 includes an elongate bracket 124 that carries a pair of slide clamps 126 mounted on an upper side of the bracket 124. The arms 88 are formed as slide rails that are configured to receive and hold the slide clamps 126. When unclamped, the slide clamps 126 are movable along the length of the arms 88 for axial positioning of the bracket assembly 122 along the arms 88.

As shown in FIGS. 17-20, a shaft 86 is attached to the lower side of a bracket 124 by bearing blocks 130 that enable rotation of the shaft 86 about the shaft axis. The short leg 132 of the fence member 84 is fixedly attached to the shaft 86 by blocks 134. An actuator 136 is attached to the bracket 124 and has an actuator rod connected to a block 138 fixed to the shaft 86. The actuator 136 drives the fence member 84 between vertical and horizontal orientations as shown in FIG. 10.

The arms 88 are attached to the frame 82 by an arm lift assembly 140 carried on the frame 82. The arm lift assembly 140 includes a pair of vertical shafts 142 journaled in bearings 144 for vertical movement with respect to the frame 82. A lower tie beam 145 connects the lower ends of the shafts 142 and carries the arms 88. An upper tie beam 146 connects the upper ends of the shafts 142 and is engaged by rotary cams 148 driven by a motor 150. Rotation of the cams 148 causes controlled vertical displacement of the tie beam 146 and conjoint vertical displacement of the shafts 142, utilizing the weight of the vertical shafts 142 and attached bodies to urge the arms 88 towards their extended positions.

FIGS. 21-28 illustrate operation of the bottle stabilizer assembly 120 to form the same article layer as illustrated in FIGS. 2-8. FIG. 21 corresponds to FIG. 2 and illustrates the first row set 42 just reaching the accumulation area 40 defined by the stop fence 36. The arm 88 of the bottle stabilizer assembly 120 is in its initial position with respect to the conveyor belt 30 and the intermediate fences are in their initial, horizontal orientations to allow movement of the first row set 42 past the bottle stabilizer assembly 120.

Figure 3:
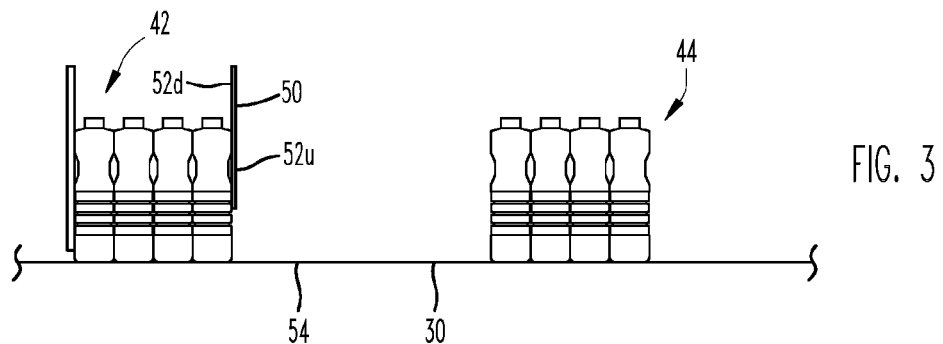

FIG. 22 corresponds to FIG. 3 and illustrates the intermediate fence 50 moved to its operating position and defining the accumulation area 54. The intermediate fence 50 and the stop fence 36 cooperate to stabilize the bottles of the first row set 42.

FIG. 23 illustrates the second row set 42 just reaching the accumulation area 54.

FIG. 24 corresponds to FIG. 4 and illustrates the intermediate fence 56 moved to its operating position and defining the accumulation area 58. The intermediate fence 58 and the intermediate fence 50 cooperate to stabilize the bottles of the second row set 44.

FIG. 25 illustrates the third row set 60 just reaching the accumulation area 58.

FIG. 26 corresponds to FIG. 5 and illustrates the intermediate fence 62 moved to its operating position and defining the accumulation area 64. The intermediate fence 62 and the intermediate fence 56 cooperate to stabilize the bottles of the third row set 60.

FIG. 27 illustrates the fourth and last row set 66 just reaching the accumulation area 64.

FIG. 28 corresponds to FIG. 6 and illustrates the intermediate fence 68 moved to its operating position. The intermediate fence 68 and the intermediate fence 62 cooperate to stabilize the bottles of the fourth row set 66.

The article layer is now complete and the motor of the arm lift assembly is actuated to raise the arm vertically away from the conveyor belt 30. The intermediate fences remain in their vertical orientations and slide past bottles pressed against them to clear the article layer. Once clear of the article layer, the intermediate fences are moved back to their horizontal orientations and the arm lift assembly moves the arm back to its initial operating position to be ready for forming a new article layer.

In other embodiments of the disclosed method, the intermediate fences can be closely spaced away from the last article row when placed in their operating positions if it is desired not to engage the bottles.

In yet other embodiments of the disclosed method, the most downstream fence of some embodiments of the bottle stabilizer assembly can act as the downstream fence. For example, the intermediate fence 50 of the bottle stabilizer assembly 70 could be placed in its operating position to obstruct the first article row 42.

In yet other embodiments of the disclosed method, the step of placing an intermediate fence behind the last row of the article layer is eliminated.

While one or more embodiments have been disclosed and described in detail, it is understood that this is capable of modification and that the scope of the disclosure is not limited to the precise details set forth but includes modifications obvious to a person of ordinary skill in possession of this disclosure and also such changes and alterations as fall within the purview of the following claims.

What is claimed is:

1. An article stabilizer device for stabilizing articles being accumulated on a moving conveyor belt, the article stabilizer device comprising:
   a frame;
   a plurality of fences movably attached to the frame, each fence being independently and selectively movable with respect to the frame from a first standby position to an operating position, the plurality of fences being movable with respect to the frame from the operating position to a second standby position, the plurality of fences being movable with respect to the frame from the second standby position to the first standby position;
   the article stabilizer device being in a first operating state when the fences are each in the first standby position and in a second operating state when the fences are each in the operating position and in a third operating state when the fences are each in the second standby position;
   when the article stabilizer device is in the second operating state, the fences being spaced apart from each other and defining a conveyor path with respect to the frame extending in a downstream direction along the fences, the fences being adapted to obstruct articles being conveyed by the conveyor belt along the conveyor path when the conveyor path is located adjacent the conveyor belt, the fences being spaced apart from one another wherein adjacent pairs of fences cooperatively define an accumulation area between them along the conveyor path to permit articles on the conveyor path to be captured and retained in the accumulation area between the adjacent pairs of fences;
   when the article stabilizer device is in the first operating state or the third operating state, the fences being spaced away from the conveyor path so as to not obstruct articles being conveyed by the conveyor belt when the conveyor path is located adjacent the conveyor belt;
   each upstream fence of the adjacent pairs of fences being movable from the first standby position to the operating position without entering the accumulation space cooperatively defined between the upstream fence and the adjacent downstream fence of the adjacent pair of fences; and
   each fence being movable from the operating position of the fence to the second standby position of the fence without entering any accumulation area cooperatively defined by the fence.

2. The article stabilizer device of claim 1 wherein the plurality of fences are mounted on an elongate fence holder extending along the conveyor path, the fence holder being movable with respect to the frame between an operating position and a standby position, each fence of the plurality of fences being capable of moving from the first standby position of the fence to the operating position of the fence when the fence holder is in the operating position of the fence holder, each of the plurality of fences being in the second standby position of the fence when the fence holder is in the standby position of the fence holder.

3. The article stabilizer device of claim 2 wherein each fence of the plurality of fences rotates about a respective axis of rotation when moving from the first standby position of the fence to the operating position of the fence.

4. The article stabilizer device of claim 3 wherein the fence holder is movable along a longitudinal axis when moving between the operating position of the fence holder and the standby position of the fence holder, each axis of rotation of the plurality of fences being perpendicular to the longitudinal axis.

5. The article stabilizer of claim 4 wherein each fence of the plurality of fences translates along a respective longitudinal axis parallel with the longitudinal axis of the fence holder without rotation with respect to the frame when moving from the operating position of the fence to the second standby position of the fence.

6. The article stabilizer of claim 4 wherein each fence of the plurality of fences rotates along the respective axis of rotation during the movement of the fence from the second standby position of the fence to the first standby position of the fence.

7. The article stabilizer of claim 6 wherein each fence of the plurality of fences translates along the respective longitudinal axis during the movement of the fence from the second standby position of the fence to the first standby position of the fence.

8. The article stabilizer of claim 2 wherein each fence of the plurality of fence holders is an integral one-piece fence holder.

9. The article stabilizer of claim 2 wherein each fence of the plurality of fences is releasably attached to the fence holder, the fence movable along the fence holder when released.

10. The article stabilizer of claim 9 comprising a respective actuator connected to each fence of the plurality of fences, each actuator operable to move the fence connected to the actuator between the first standby position of the fence and the operating position of the fence.

11. The article stabilizer device of claim 2 comprising an actuator mounted on the frame and connected to the fence holder, the actuator comprising a rotary cam drive.

12. The article stabilizer device of claim 1 wherein each fence translates along a respective longitudinal axis when the fence moves between the first standby position of the fence and the operating position of the fence and translates along the same respective longitudinal axis when moving from the operating position of the fence to the second standby position of the fence.

13. The article stabilizer device of claim 1 wherein each fence is formed as a flat plate having opposed flat sides, at least one flat side facing the conveyor path when the fence is in the operating position.

14. The article stabilizer of claim 1 wherein each fence of the plurality of fences is attached to a respective actuator that moves the fence from the first standby position of the fence to the operating position of the fence and from the operating position of the fence to the second standby positon of the fence, the first standby position of the fence being the same position with respect to the frame as the second standby position of the fence.

15. The article stabilizer device of claim 1 wherein each fence comprises a pair of fence halves, the fence halves being placed in a side-by-side relationship when the fence is in the operating position of the fence, the fence halves being spaced apart from one another when the fence is in the first standby position of the fence and when the fence is in the second standby position of the fence.

16. The article stabilizer device of claim 15 wherein each fence half of each fence of the plurality of fences rotates about a respective axis of rotation when the fence half moves to or from the operating position of the fence.

17. The article stabilizer device of claim 16 wherein the pair of fence halves of each fence of the plurality of fences translate along a common longitudinal axis when the fence halves moves to or from the operating position of the fence.

18. The article stabilizer device of claim 1 wherein each fence of the plurality of fences is associated with a respective sensor, the sensor placed along the conveyor path and being disposed to generate a signal indicating that an article set on the conveyor path has passed the sensor.

19. The article stabilizer device of claim 1 in combination with a conveyor belt configured to convey articles in a downstream direction and a stop fence, the stop fence being spaced in the downstream direction from the article stabilizer device, the stop fence being movable between a standby position spaced away from the conveyor belt and an operating position closer to the conveyer belt that obstructs the movement of articles on the conveyor belt, the stop fence being movable independently of the plurality of fences of the article stabilizer device.

20. A method for forming on a moving conveyor belt an article layer formed of a plurality of article row sets, each article row set formed from one or more rows of articles, the method comprising the steps of:

(a) conveying on the conveyor belt an article row set in a downstream direction to a fence extending across the conveyor belt and being disposed to obstruct further downstream movement of articles on the convey belt;

(b) when the article row set reaches the fence obstructing further downstream movement of the article row set, placing an additional fence across the conveyor belt adjacent a last upstream row of the article row set wherein the article row set is captured between the fence and the additional fence, the additional fence being disposed to obstruct further downstream movement of articles on the conveyor belt;

(c) if the article layer is not complete, conveying an additional article row set on the conveyor belt in the downstream direction towards the most upstream fence obstructing the conveyor belt;

(d) repeating steps (a), (b), and (c) until the article row set is complete and all the article row sets are captured between adjacent pairs of fences;

(e) after the article layer is complete, moving all but the most downstream fence away from the conveyor belt to a standby position, the fences when in the standby positions not obstructing further downstream movement of the article layer on the conveyor belt;

(f) after performing step (e), moving the most downstream fence away from the conveyor belt to a standby position wherein the most downstream fence does not obstruct downstream movement of the article layer on conveyor belt; and (g) after performing step (f), conveying the article layer on the conveyor belt past the most downstream fence.

21. The method of claim 20 wherein step (b) comprises the step of:

(h) rotating each additional fence along at least one respective axis of rotation.

22. The method of claim 20 wherein step (b) comprises the step of:

(h) translating each additional fence along a longitudinal axis.

23. The method of claim 20 wherein step (e) comprises the step of:

(h) translating each additional fence away from the conveyor belt along a respective longitudinal axis.

24. The method of claim 23 comprising the step of:

(i) after performing step (h), translating the additional fences conjointly towards the conveyor belt if another article layer is to be formed on the conveyor belt.

25. The method of claim 20 wherein each article row set when captured between the adjacent pair of fences is compressed between said adjacent pair of fences.

26. The method of claim 20 comprising the step of:

(h) moving the most downstream fence back towards the conveyor belt after performing step (g).

* * * * *